May 17, 1949.    R. M. BOWIE    2,470,464
TIMING AND PHASE CONTROL CIRCUITS
Filed Aug. 3, 1942    5 Sheets-Sheet 1

ROBERT M. BOWIE
INVENTOR

BY John J. Logan
ATTORNEY

May 17, 1949.　　　　R. M. BOWIE　　　　2,470,464
TIMING AND PHASE CONTROL CIRCUITS

Filed Aug. 3, 1942　　　　　　　　　　　5 Sheets-Sheet 2

ROBERT M. BOWIE
INVENTOR

BY John J. Rogan
ATTORNEY

Robert M. Bowie
INVENTOR

BY John J. Logan
ATTORNEY

May 17, 1949.   R. M. BOWIE   2,470,464
TIMING AND PHASE CONTROL CIRCUITS
Filed Aug. 3, 1942   5 Sheets-Sheet 5

ROBERT M. BOWIE
INVENTOR

BY John J. Logan
ATTORNEY

Patented May 17, 1949

2,470,464

UNITED STATES PATENT OFFICE 2,470,464

TIMING AND PHASE CONTROL CIRCUITS

Robert M. Bowie, Emporium, Pa., assignor to Sylvania Electric Products Inc., a corporation of Massachusetts Application August 3, 1942, Serial No. 453,367

34 Claims. (Cl. 343—13)

This invention relates to phase difference determining devices and methods for the determination of the phase or relative times of arrival of two signals from the common origin.

It is a principal object to provide methods and means for increasing the accuracy of such phase determination and time of arrival. Accordingly, the method and apparatus described herein are of great value when applied to radio goniometers, altimeters, range-finding and the like.

In radio goniometers or locators, the distance from an object is usually determined from the radio echo time and may be measured as the phase difference between transmitted and reflected signals. In some instances, the transmitted signal is a continuous R. F. wave. In other cases, it may be a signal which is applied either as amplitude or frequency modulation upon a radio frequency carrier. It is desirable to operate the locator at such a modulation signal frequency that no ambiguity can exist relative to the reflected signal over the entire range of usefulness of the locator, requiring that the signal period must be at least great enough so that the radio energy can leave the transmitter, be reflected, and return to the receiver or phase comparator in less than one period. The base range of such an instrument can be defined as the distance to which radio energy can be transmitted and reflected back in the time exactly equal to one period of the signal. An improvement in accuracy is therefore directly associated with a decrease in the base range and vice versa. I have disclosed in my prior application Serial No. 435,157, filed March 18, 1942, an arrangement for determining accurately the phase between two signals, preferably of equal frequency, derived from the same source and transmitted over different paths for which the transmission times may be unequal. In that application, I have disclosed an arrangement whereby accuracy of the compensating calibrated phase shift device can be improved without necessarily changing the signal frequency. This has been accomplished by using a master oscillator which operates at a multiple of the signal frequency, i. e., a multiple of the frequency at which the comparison of the two signals is to be made; and the compensating time delay, in the form of a known or calibrated phase shift is introduced between the common or master source and one of the frequency dividers. From the disclosure of my prior application, it will be seen that the phase shift mechanism must be calibrated up to $2\pi n$ radians where "$n$" is the ratio of the two frequencies. Accordingly, it is a principal object of this invention to provide methods and means for producing an unambiguous determination of the phase between two signals whose frequencies bear an integral relation.

A feature of the invention relates to a system wherein two signals of different phases are derived from a master oscillator and are subsequently subdivided in frequency in conjunction with a phase comparator which is jointly controlled by both signals over different paths, the comparator being arranged to avoid ambiguous "zero" settings tending to result from the multiple frequency ratio between the two signals.

Another feature relates to means for producing two signals of different, but integrally related frequencies, which are to be transmitted over two paths for phase comparison purposes, in conjunction with means for definitely and unambiguously identifying the proper cycle of the higher frequency signal which is to be used for phase comparison with the lower frequency signal.

A further feature relates to means for producing two signals of different but integrally related frequencies which are to be transmitted over different paths for phase comparison, wherein automatic means are provided for blanking out all cycles except a selected cycle of the higher frequency signal for comparison with the lower frequency signal.

A further feature relates to an arrangement for producing two signals of different but integrally related frequencies which are to be transmitted over different paths for phase comparison, means being provided for selecting a particular recurring cycle of the higher frequency signal for phase comparison with the lower frequency signal, and wherein said selection is controlled by the amount of phase delay necessary to be introduced into one path to equalize the phases at a common comparator.

A further feature relates to a phase comparator of the cathode-ray tube type having coordinate ray deflection systems wherein both systems are controlled by signals from a master oscillator but at different integrally related frequencies, which frequencies are transmitted over separate paths for phase comparison, and wherein the particular recurring cycle of the higher frequency signal which is selected for comparison with the lower frequency signal is controlled by the lower frequency signal and in accordance with the amount of delay which must be applied to the higher frequency signal to bring it into phase with the low frequency signal.

A further feature relates to a phase comparator of the cathode-ray tube type having a pair of coordinate deflection systems, one of which is controlled at a frequency $f$ and the other of which is controlled at a frequency $nf$, both frequencies being derived from a common master oscillator, in conjunction with a calibrated phase delay device acting from one of said frequencies before application to said comparator, and a pulse blanker which is controlled by the frequency $f$ for particularizing the proper cycle of the $nf$ frequency for comparison with the $f$ frequency at the comparator.

A further feature relates to a phase comparator of the cathode-ray tube type having a pair of coordinate-ray deflection systems, one of which is controlled at a frequency $f$ and the other at a frequency $nf$, in conjunction with a device for producing a blanking pulse under control of the frequency $f$ and for delaying the blanking pulse with respect to the frequency $f$ in accordance with the amount of phase shift necessary to be applied to said frequencies to bring them into phase at the comparator.

I have disclosed in my prior application that it is preferable to employ signal frequency subdivider circuits employing devices which change states of conductivity abruptly upon the receipt of a steep wave front. A divider of that type in effect counts the number of pulses received by it until a predetermined number have been received, e. g. four. Upon the receipt of the fourth impulse, the circuit immediately delivers a pulse from its output. Such a circuit will therefore divide random pulses as well as periodic pulses. Hence any kind of disturbance which introduces a spurious pulse into the input can cause the divider to miscount as far as the periodic pulses are concerned. Should this occur, it is then necessary to reset the zero. When the phase-determining device is being used as a goniometer or radio locator for aeroplanes and the like, it is essential that the zero setting remain unchanged over very long periods of time.

It is therefore another principal object of the invention to provide a frequency subdividing arrangement of the impulse counting type which automatically corrects itself if spurious impulses are introduced into the counter. As a result of this improved arrangement, the locating device or goniometer is free from ambiguities tending to result from spurious signals.

Another feature relates to a pulse counter which can be used for frequency subdivision, timing and the like, wherein the effects of interjection of spurious impulses have no cumulative result on the counting.

Another feature relates to a novel form of pulse delaying network.

Another feature relates to an arrangement responsive to periodic impulses for delaying said impulses and also for providing a "blanking" pulse whereby a selected recurrent cycle of a higher frequency signal such as a cathode-ray tube deflection signal can be selected or particularized.

A further feature relates to the novel organization, arrangement and relative interconnection of parts which constitute an improved phase-determining and comparing system.

Other features and advantages not specifically enumerated will be apparent after a consideration of the following detailed descriptions and the appended claims.

In the drawing which shows certain preferred embodiments,

Fig. 7 is a series of wave diagrams explanatory of the automatic zero correction of the pulse subdivider.

Figs. 7a and 7b are schematic illustrations of the appearance of the cathode-ray tube screen during the short period when automatic zero correction is taking place, while Fig. 7c shows the appearance when the correction has been accomplished.

In one of its aspects, the invention is in the nature of an improvement on the type of radio range and locating system described in my co-pending application Serial No. 435,157, filed March 18, 1942.

Figure 1:
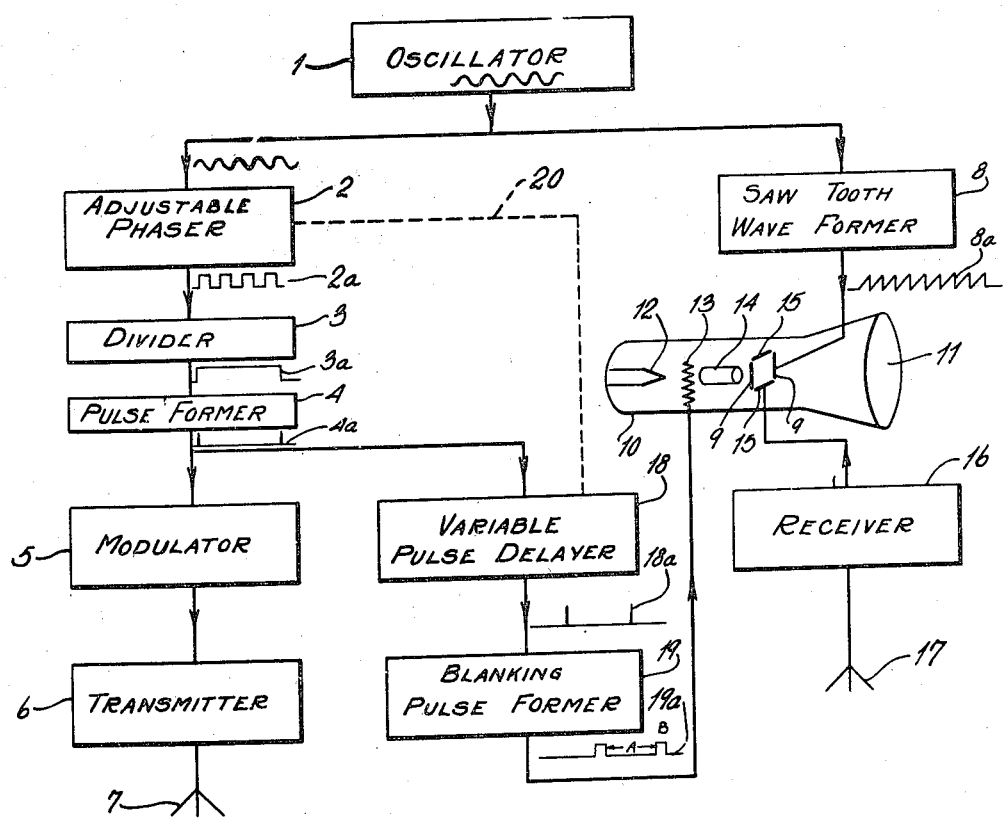
Fig. 1 is a schematic block diagram of a range-finding system embodying features of the invention.

Referring to Fig. 1 of the present drawing, the numeral 1 represents a controlled frequency oscillator of any well-known type capable of generating sustained oscillations, preferably, although not necessarily, of sinusoidal form and at a frequency for example of the order of 3272 C. P. S. A portion of the output of oscillator 1 is applied to a calibrated phase adjusting device or network 2 of any known construction, preferably of the type disclosed in said application Serial No. 435,157. The adjusted output of phaser 2 may be applied to a wave forming network to produce square topped waves $2a$ of the same frequency. These square topped waves are then applied to a frequency subdivider 3 which may be of any well-known type. Best results are obtained with divider circuits which change their states of conduction suddenly and substantially coincidentally with the receipt of a steep wave front. As examples of such dividers may be mentioned, multi-vibrator electron tube oscillators, blocking tube oscillators e. g., a self-quenching oscillator such as a super-regenerator, or a "scale of 8" such as described by Lifschutz in Review of Scientific Instruments, vol. 9, page 83 (March 1938). Preferably, the divider is so designed and adjusted that it produces a series of square topped waves $3a$ of a regular frequency which is an integral submultiple of the frequency of waves $2a$. The waves $3a$ are then impressed upon any well-known pulse former 4 to produce sharp pulses $4a$ corresponding to the leading or trailing edges of each of the waves $3a$. Pulses $4a$ are applied to modulator 5 to modulate the high frequency transmitter 6 which excites the directional antenna 7.

Another portion of the master oscillations from source 1 are applied to any well-known network 8 for producing saw-tooth waves $8a$ of the same frequency as source 1, which saw-tooth waves after suitable amplification are applied to the horizontal deflector plates 9—9 of a cathode-ray tube oscilloscope 10. Tube 10 may be of any well-known construction having a fluorescing screen 11 at one end and an electron gun at the other end. This electron gun as is well-known may include an electron-emitting cathode 12, a control grid 13, and an accelerating and beam focussing electrode system 14. By this means a small electron spot is projected on screen 11 and this spot can be moved in two coordinate directions by horizontal deflector plates 9 and by vertical deflector plates 15. The vertical plates 15 are arranged to be energized under control of the demodulated output of the radio receiver 16 which in turn is fed by the directional receiving antenna 17 which picks up the waves radiated from antenna 7. Preferably, although not necessarily, antennae 7 and 17 are relatively close, or at least are separated by a calibrated distance, so that antenna 17 is energized not only by the waves radiated directly thereto from antenna 7 but is also energized by the waves from antenna 7 after they have been directed to and reflected from an object or objects whose range, distance or location is to be indicated on screen 11.

Inasmuch as the horizontal deflection frequency is "$n$" times the vertical deflection frequency, where "$n$" is the ratio of division of divider 3, it is essential that the zero setting remain unchanged over very long periods of time and so that ambiguity which might otherwise result from the multiple frequency relations between the vertical and horizontal scans can be avoided. In order for the phase shift calibrations of the device 2 to have the proper significance, it must be set at zero when the time delays are equal along the two paths leading respectively to the horizontal plates 9 and to the vertical plates 15. The time delay along one of the paths may include a portion of the sawtooth scanning time when the indication of synchronization occurs at the center of the cathode ray tube screen. Since the divider 3 is preferably one which changes state of conduction abruptly upon the receipt of a steep wave front, any random impulses as well as periodic impulses will be counted. Consequently, any kind of disturbance which introduces a spurious pulse into the input can cause the divider to miscount as far as the periodic pulses are concerned. Should this occur, it is necessary to reset to zero. Divider 3 in Fig. 1 is really a pulse counter which produces a rectangular output signal changing polarity in response to every set of four steep positive pulses arriving at its input. (Instead of counting sets of four impulses, the divider might, of course, be built for counting other integral numbers of positive pulses.) As long as the input signal has a perfect periodic shape, like the one shown as $2a$ in Fig. 1, the counter 3 operates really as a frequency divider. Unfortunately, counters of this type are very sensitive, and it is practically impossible to shield them completely from the effects of static, lightning and other undesirable disturbances which may take place in the neighborhood of the timing device. In any event, experiments have shown that the shape of the input signal fed into divider 3 is not always periodic, as shown by $2a$ in Fig. 1. Actually, say as a result of static, it frequently happens that a spurious signal with steep positive front is occasionally superimposed on the signal of shape $2a$, and fed into divider 3. As the divider is really a counter, it will not only count the four steep positive pulses shown in $2a$ but will count any four consecutive steep positive pulses. Depending on the nature of the spurious pulse, it may either shorten or lengthen the duration of the square wave output signal $3a$, thus interfering with the periodic operation of the counter as a frequency divider. The spurious pulse being considered enters the input of divider 3 and, as a counter intended for sets of four consecutive equal periods of signals of shape $2a$, the divider miscounts as a result of the interfering spurious pulse. Therefore, the distance between two consecutive vertical pulses of the shape $4a$ in Fig. 1, or the time between consecutive pulses modulating transmitter 6, suddenly changes at the instant when the pulse signal is fed into divider 3. This happens just once, at the instant the spurious pulse occurs. Starting from this instant the divider 3 goes on counting periodically four consecutive pulses of the shape $2a$, as it did before, until another spurious pulse enters the divider input, which may happen several minutes later.

Assuming now, for the moment, that the blanking pulse on grid 13 were derived from signal $8a$ rather than from signal $4a$, the positive grid signal B would remain coinciding with every fourth one of the scans $8a$, or to be more specific, if N is the order number of a particular scan (oblique line of sawtooth signal $8a$) counting from an arbitrary beginning, positive grid signal B would occur during scans characterized by the number $N/4+k$ where $N/4$ is an integer and $k$ is less than 4.

If the reflected signal has arrived at the receiver before the interference of the spurious signal simultaneously with the scans $N/4+k$, it will not arrive during these scans any longer after the interruption of the normal sequence of vertical pulses $4a$ by the spurious signals fed to input of divider 3. The echo signal would thus disappear from screen 11 of cathode ray tube 10 and a new zero setting of the adjustable phaser would be necessary for obtaining the correct phase difference. This is impracticable in particular in case of radio locating of a fast-moving distant object. It is therefore necessary to provide means which automatically shift the positive grid signal B in such a way that it arrives at grid 13 with a fixed delay after the arrival of each pulse $4a$ at the input of delayer 18. This is the reason why, according to the invention, blanking signal $19a$ in Fig. 1 is not derived directly from output signal $8a$ of sawtooth former 8, but from the output of pulse former 4, and why positive grid signal B is delayed for the time period of time after every arrival of the periodic pulse $4a$. According to this timing of the grid signal by means of correction circuit 18, the positive grid pulse B will always coincide with a vertical scan which takes place a predetermined time after the occurrence of a pulse $4a$. If the time delay produced by delayer 18 was "particularizing" scan number $N/4+1$ before the interference of this spurious signal, i. e. was coordinating grid signal B with scan $N/4+1$, it will particularize scan number $N/4+2$ (or $N/4$ or $N/4+3$ depending on the error caused by the interference pulse) after the interruption by the spurious signal.

Finally, the mechanical coupling 20 indicated by a dotted line in Fig. 1 merely adjusts the zero setting of the variable pulse delayer 18 together with that of phase adjuster 2. The advantage of the correcting circuit composed of variable pulse delayer 18 and blanking pulse former 19 over a direct blanking pulse forming from signal $8a$ out of sawtooth circuit 8 becomes now obvious. It automatically coordinates the time of blanking pulse B on grid 13 with that particular horizontal scan during which the reflected signal returns to the receiver, quite independent of occasional interruptions of the periodic sequence of vertical pulses 4a by spurious pulses superimposed on the periodic signal 2a fed to the input of divider 3.

Figure 2:
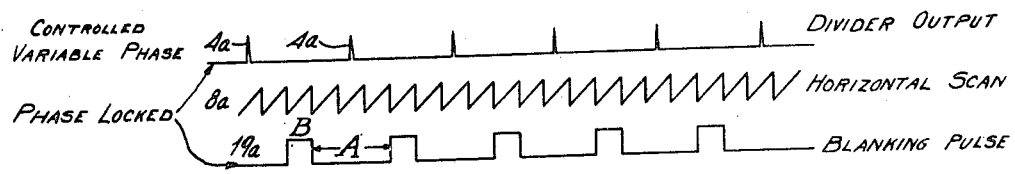
Fig. 2 is a wave diagram to explain certain features of the invention.

To avoid ambiguity and automatically to restore the system to its proper zero setting after a miscount due to a spurious pulse, a portion of the output of the subdivided frequency pulse from 4 is applied to an adjustable pulse delayer 18, the adjustable element of which is mechanically connected to the adjusting element of device 2 as represented by the numeral 20, so that the amount of delay in device 18 is proportional to the amount of adjustment of phaser 2 necessary to equalize the phases over the two paths leading respectively to the horizontal and vertical plates of tube 10. Consequently, the delay in output of the device 18 will be definitely correlated with the distance of the object from the receiver and comparator and furthermore the particular one of each set of four horizontal scans corresponding to the proper vertical scan will be properly particularized. In order to produce a visual signal only during this "particularized" horizontal scan, it is necessary to blank out the electron beam, so far as its action on screen 11 is concerned, during the remaining three of the four horizontal scans. For this purpose, the signal 18a from delayer 18 is applied to the blanking pulse former 19 to produce a positive square topped signal B (Figs. 2 and 5) only at the instant corresponding to the proper particularized horizontal scan. Thus as shown in Fig. 2, the signal 4a from divider 3 and pulse former 4 is shown as a function of time; the curve 8a shows the horizontal scan signal applied to plates 9; while curve 19a shows the blanking pulse produced by the device 19. Under the assumption that the horizontal scan frequency is four times the signal 4a and since 4a and 19a are phase locked through the mechanical coupler 20, the adjustment of member 20 at any given position will determine the phase delay between pulses 4a and 19a, and this delay will remain fixed according to the setting of member 20. This delay will therefore be a function of the range of the object whose distance is being determined. Thus in the particular relation illustrated in Fig. 2, the member 20 has been adjusted so that the pulses 19a particularize the third of each set of four recurring horizontal scans 8a. Consequently, there can be no ambiguity as to which horizontal scan is being viewed on the screen 11. In other words, the blanking pulse A (Fig. 2) is in effect a negative voltage which when applied to the control grid 13 of tube 10 prevents the production of a visual trace on screen 11, and a trace is only produced under control of the positive component B which is a sensitizing or coordinating pulse, particularizes the third horizontal scan of each set of four. It should be understood that the blanking pulses and the horizontal scan remain locked together for any given setting of device 2 but are movable manually in time with reference to divider output.

In the foregoing, the proper one of each set of four horizontal scans will be particularized only so long as the divider 3 receives the periodic impulses of the proper frequency. If a spurious pulse should be interjected, the divider would ordinarily miscount and the blanking pulse A (Fig. 2) would continue to particularize a wrong one of the four horizontal scans. However, by means of the operation of the devices 18 and 19, the blanking pulse can particularize the wrong scan for an extremely short interval of time, of the order of the period of the divided output. This period will be so short as not to interfere with the subsequent operation of the cathoderay indicator.

Figure 3:
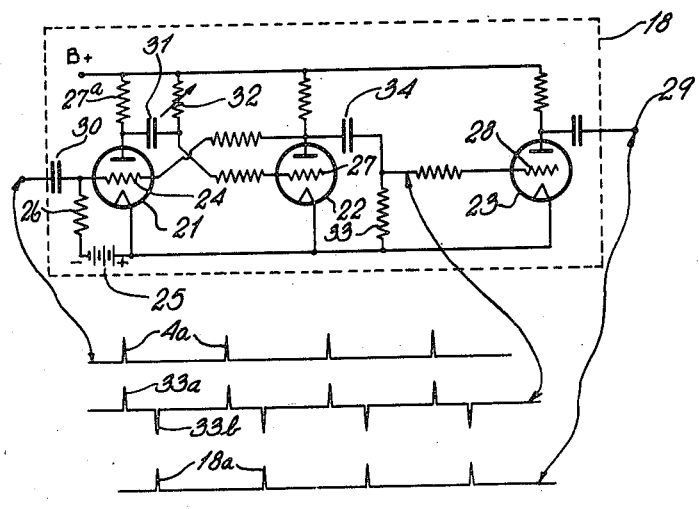
Fig. 3 is a schematic wiring diagram of the variable pulse delayer according to the invention.

Referring to Fig. 3, there is shown a preferred form of variable pulse delayer 18. It comprises a set of three tubes 21, 22, 23, preferably of the high vacuum type. In the steady state, the control grid 24 is biased through battery 25 and resistor 26 so that negligible plate current flows through load resistor 27a in the plate circuit of the tube. Under this condition, control grid 27 of tube 22 is biased positively with respect to its cathode so that it draws both grid and plate current. At the same time, control grid 28 of tube 23 draws current, with the result that the output at terminal 29 is at a minimum. When the steady state is disturbed by the application of a pulse of the type represented by 4a from the divider and pulse former of Fig. 1, a sudden change in the state of conduction is initiated between the cathode and plate of tube 21 which thereupon becomes conducting. This plate current charges condenser 31 through the adjustable timing resistor 32 so that the bias of grid 27 is thereupon reduced to a value at which the plate circuit of 22 becomes non-conductive. This condition continues only so long as the plate circuit of tube 22 is non-conductive. As the timing circuit 31, 32 discharges, an instant is reached when tube 22 starts to reconduct whereupon the circuit suddenly reverts to its steady state. Thus, the duration of the unstable state of conduction of the circuit can be controlled by adjustment of the resistor 32. The voltage which is applied to the condenser 34 is a square topped wave which develops positive and negative pulses represented by pulses 33a, 33b, across the resistor 33. The positive pulses 33a are synchronous with the pulses 4a, while the negative pulses 33b are delayed as determined by the adjustment of resistor 32. The action of tube 23 is to eliminate the positive pulses 33a and to invert the negative pulses 33b to give the delayed pulses 18a at the output terminal 29.

Figure 4:
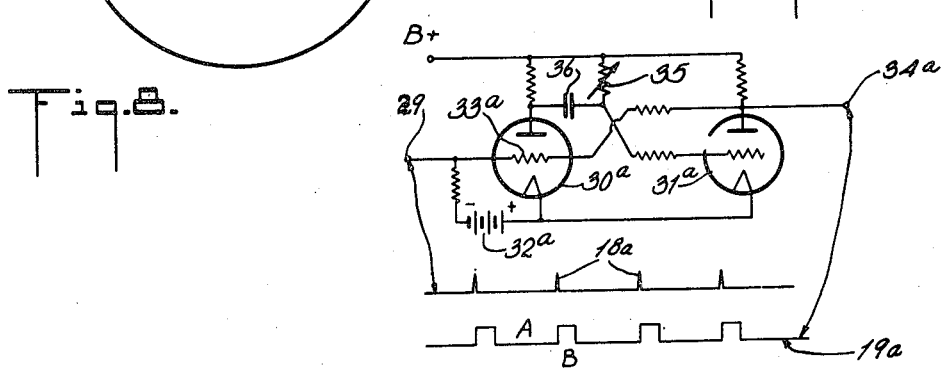
Fig. 4 is a schematic wiring diagram of the blanking pulse former according to the invention.

The blanking pulse former to which terminal 29 is connected is similar to that of Fig. 3 but with all the components to the right of tube 22 omitted. This is illustrated in Fig. 4 wherein the tubes 30a, 31a, are similar to tubes 21 and 22 and function in the same manner. Thus in the steady state, tube 30a is biased by battery 32a to plate current cut-off while tube 31a is conductive. When delayed pulse 18a from device 18 (Figs. 1 and 3) is applied to grid 33a, it results in square-topped waves 19a at the output terminal 34a as represented by the negative component A and the positive component B. The component A is referred to herein as the blanking pulse while component B is referred to as a sensitizing pulse and their durations are controlled by the time constant of the combination 35, 36. It will be seen, therefore, that the length of the blanking pulse A is determined by the setting of resistor 35 and is adjusted to give a blanking pulse of duration equal to three periods of the horizontal scan. The duration of the sensitizing pulse B is the difference between the period of the divider output and the duration of A.

Under normal conditions this is one period of the master oscillation.

Figure 5:
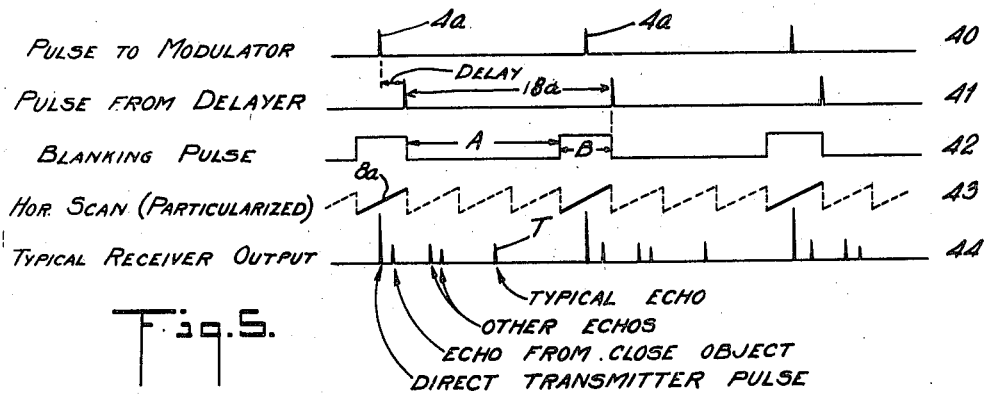
Fig. 5 is a series of wave diagrams explanatory of Fig. 1, during one adjustment of the system when the latter is operating normally.
Figure 5A:
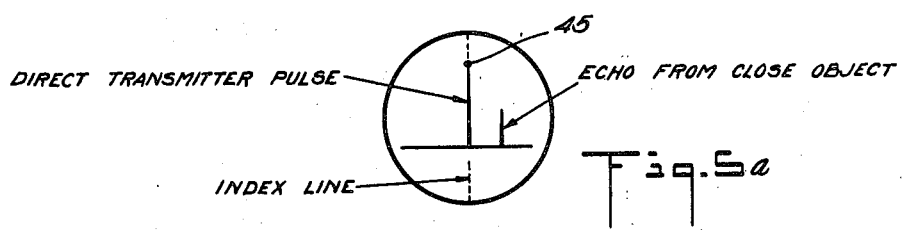
Fig. 5a is a schematic view of the visual signal produced on a cathode-ray tube screen with the setting of the apparatus explained in Fig. 5.

Referring to Fig. 5, there is shown a series of wave traces explaining the normal operation of the system of Fig. 1. The five traces 40—44 are all functions of time. Trace 40 represents the output of the divider-former 3—4 (Fig. 1); pulses 4a corresponds to those of Fig. 1. Trace 41 represents the pulses from delayer 18 and corresponds to pulses 18a (Fig. 4). Trace 42 represents the blanking and sensitizing pulses and corresponds to pulses A and B (Figs. 2 and 4). Trace 43 represents the horizontal sawtooth wave scan (Fig. 2) while trace 44 represents a typical output of the receiver 16 (Fig. 1). The delay between pulses 4a and 18a is controlled by the mechanical coupling 20. Pulse 18a initiates the negative component A of the blanking pulses 19a which, under the assumed conditions, is three times the duration of the positive component B. In other words, the negative voltage A is of such a duration that it blanks out three unwanted scans 8a as represented by the dotted saw-tooth waves in trace 43. The duration of the positive or sensitizing component B of trace 42 is then merely the difference between the duration of the blanking component A and the period of the signal of the phase delayer 18. The horizontal scan of trace 43 shows the scanning voltage as a function of time, however only during the undotted scans is the trace of the electron spot or beam visible on the screen 11 because of the effect of the blanking pulse. The typical receiver output (trace 44) comprises in this instance for illustration, several reflected signals or echoes as well as the direct transmitted pulse from 7 to 17 (Fig. 1) for which there is, of course, no reflection time, the transmitting antenna being adjacent to the receiving antenna or possibly being the same antenna. This direct pulse is of such strength as to saturate the receiver thus limiting the amplitude of the pulse to a fixed amount. The visible trace of this direct pulse on the screen 11 comes to rest at the top of the pulse for a brief moment before returning. For this reason, the direct pulse always has a bright spot at its top. In Fig. 5a which shows the visual appearance of the trace on the screen 11, this bright spot is designated by the numeral 45 at the top of the vertical trace. This spot 45 distinguishes the direct visual trace in the succeeding diagrams to be explained. In addition to the direct transmitter pulse, the typical receiver output may contain reflections from objects within the "field of view." For purposes of explanation, the drawing shows the effect of several objects, one at close range and one for which the range is being sought which will be referred to as a typical echo. As represented by Fig. 5a, the phaser 2 has been set so that the direct pulse appears at the index line on the screen 11 and in this condition the phaser time is set at zero.

Figure 6:
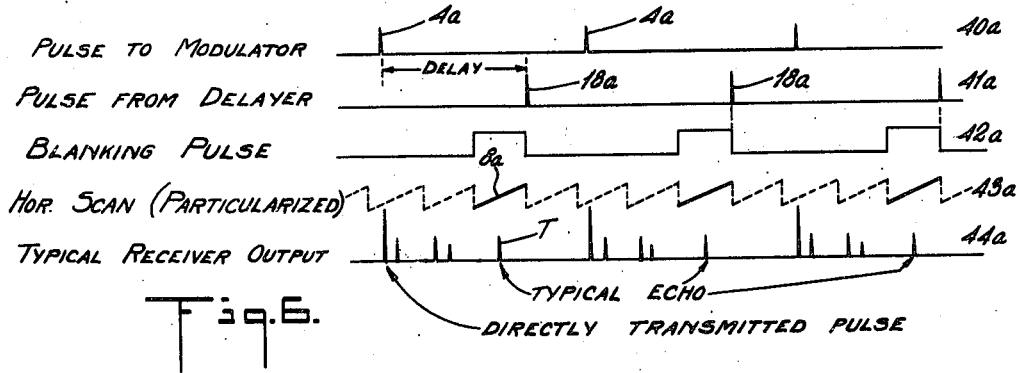
Fig. 6 is a series of wave diagrams explanatory of Fig. 1 when a range-finding adjustment is being made.
Figure 6A:
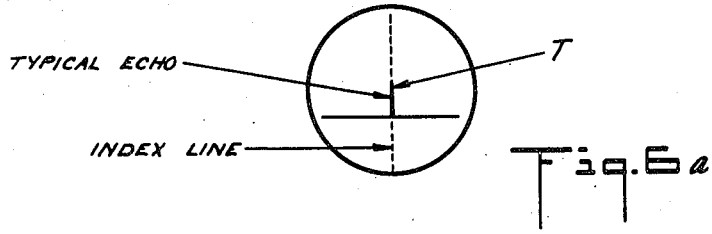
Fig. 6a is a schematic view of the cathode-ray tube signal produced with the setting explained in Fig. 6.
Figure 2:
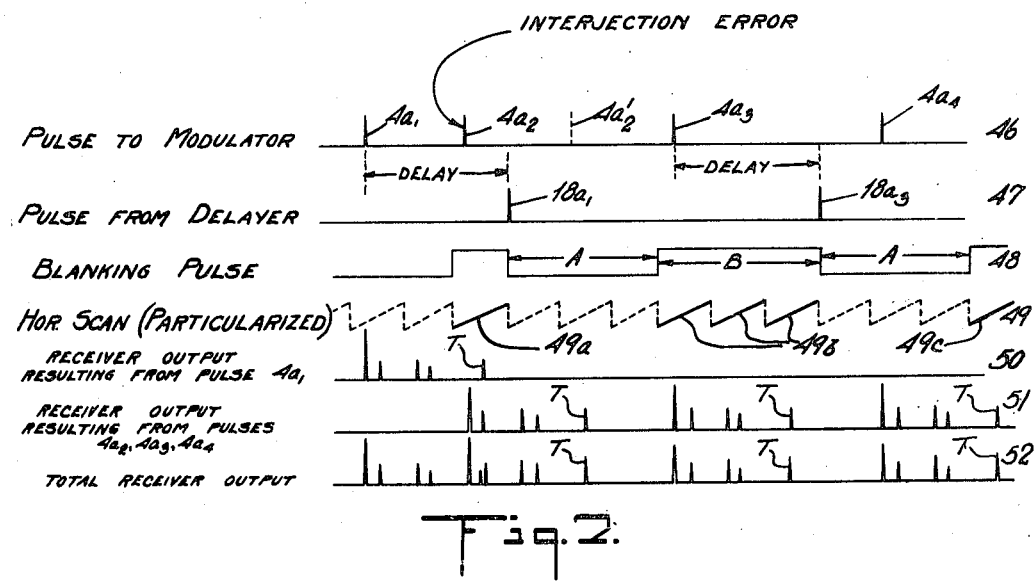
Figure 2A:
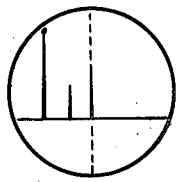
Figure 2B:
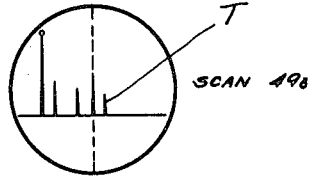
Figure 2C:
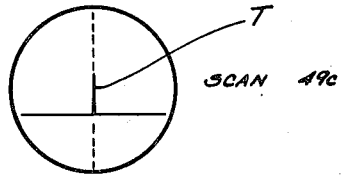

In Figs. 6 and 6a, the normal operation of the system is again depicted, but in this case the phaser dial has been rotated so as to cause the typical echo T to appear at the index line on the screen 11. As the phaser dial is rotated in the direction to produce the effect of increasing distance of reflection, the variable delayer 18 is caused by the mechanical coupling 20 to produce a longer "delay" between pulses 4a and 18a, and it will be observed that the typical echo T under this adjustment comes at the center of the particularized horizontal scan 8a. The appearance of the screen is therefore as shown in Fig. 6a.

Fig. 7 illustrates the conditions in which an injection error occurs, that is, when a spurious impulse or impulses are injected into the divider 3. The trace 46 shows the result of two spurious injections which occur between the normal pulses $4a_1$ and $4a'_2$. Thus the timing between pulse $4a$ and the next pulse $4a_2$ is, in this instance, half of what it should have been. The resulting pulse from the delayer is shown by trace 47. It will be seen that pulse $4a_1$ is in the pulse delayer when the miscounted pulse $4a_2$ comes along and since the delayer can respond to but one pulse at a time, it is unable to discriminate the arrival of pulse $4a_2$. Hence, there is no delayed pulse corresponding to the pulse $4a_2$ in the trace 47. The delayed pulse $18a_1$ initiates a blanking pulse A of normal duration at the termination of which the cathode-ray tube becomes conductive as shown by the positive component B, until the next delayed pulse $18a_3$ initiates another blanking pulse A of normal duration. Under these conditions, two undesired scans of the saw-tooth waves of trace 49 are visible during the period B of trace 48. As the result of pulse $4a_1$, the receiver produces the signal represented by the trace 50. This is the termination of a regular sequence of similar pulses resulting from regularly spaced pulses $4a$ from the divider 3. Then a new series of regular pulses is initiated resulting from pulses $4a_2$, $4a_3$, $4a_4$, and so on as shown by trace 51. The receiver integrates or adds all these pulses together and delivers a signal of the type shown in trace 52. By looking at the particularized horizontal scan and the total receiver output of trace 52, it can be seen what the screen 11 will look like. The normal appearance should be that of scan 49c (Fig. 7c) in this instance, while during scan 49a (Fig. 7a) the direct transmitter pulse and a close reflection are superimposed because of the transmitter pulse arising from pulse $4a_2$. Scan 49b (Fig. 7b) is in reality three successive scans, one of which is the desired one. In this particular case, it will be seen that spurious signals appear upon the screen 11 for the equivalent of two normal periods of the transmitter. If the master oscillator is operating at 4000 C. P. S., this means that the spurious scans would occur in 1/500 of a second and that therebefore and thereafter normal scans would be visible.

One of the most important features of the invention can be observed from Fig. 7 from whence it will be seen that the delay between pulse $4a$ and pulse $18a$, is originated from each pulse $4a$ to the modulator 5. The variable pulse delayer 18 therefore has no "memory" of what went on before the injection error. It always (except for perhaps 1/500 of a second at the time of error) particularizes a scan which follows at a predetermined time after the transmitter pulse, the echo of which it is desired to make appear at the index line on screen 11. To state this in a different way, the delay and the echo originate from the same pulses.

Figure 8:
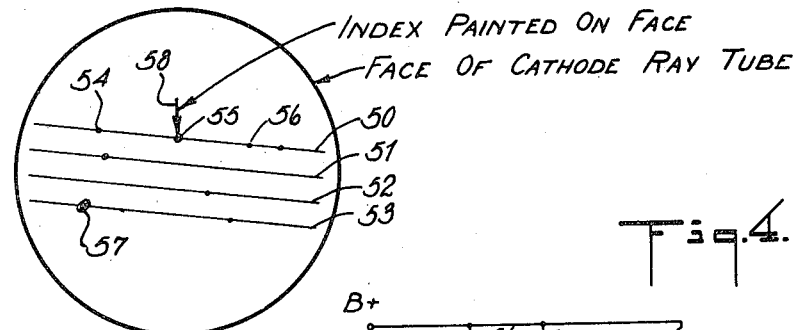
Fig. 8 shows the appearance of the cathode-ray tube screen with a different connection of the deflecting systems of the cathode-ray tube.

While one particular manner of connecting the elements of the circuit of Fig. 1 to achieve the results of the invention has been described, it will be clear that other manners of connection may be employed. For example, the phaser 2 may be located between the oscillator 1 and the wave former 8 instead of between the oscillator 1 and the divider 3. Furthermore, if the blanking pulses instead of being square-topped waves are saw-tooth waves of periodicity equal to that of the divider output and are fed to the vertical plates 15 while the output of the receiver 17 is fed to the grid 13, the screen 11 would appear as shown in Fig. 8. In this instance, four faint scanning lines 50, 51, 52, 53 would appear, and along these lines there would be bright spots 54, 55, 56, 57, etc. representing reflections from various objects in the event that the device is being used as a radio locator. If the distance corresponding to one of these reflections is of interest, the phaser 2 will be so adjusted that the index 58 will indicate the desired spot. If however the device is being used to measure phase shift or time delay in a transmission line or the like where only one reflection is involved, all four lines will have but one spot upon them. When that spot is coincident with the index 58 the difference in time delay between two paths of transmission can be read directly from the phaser time.

Figure 9:
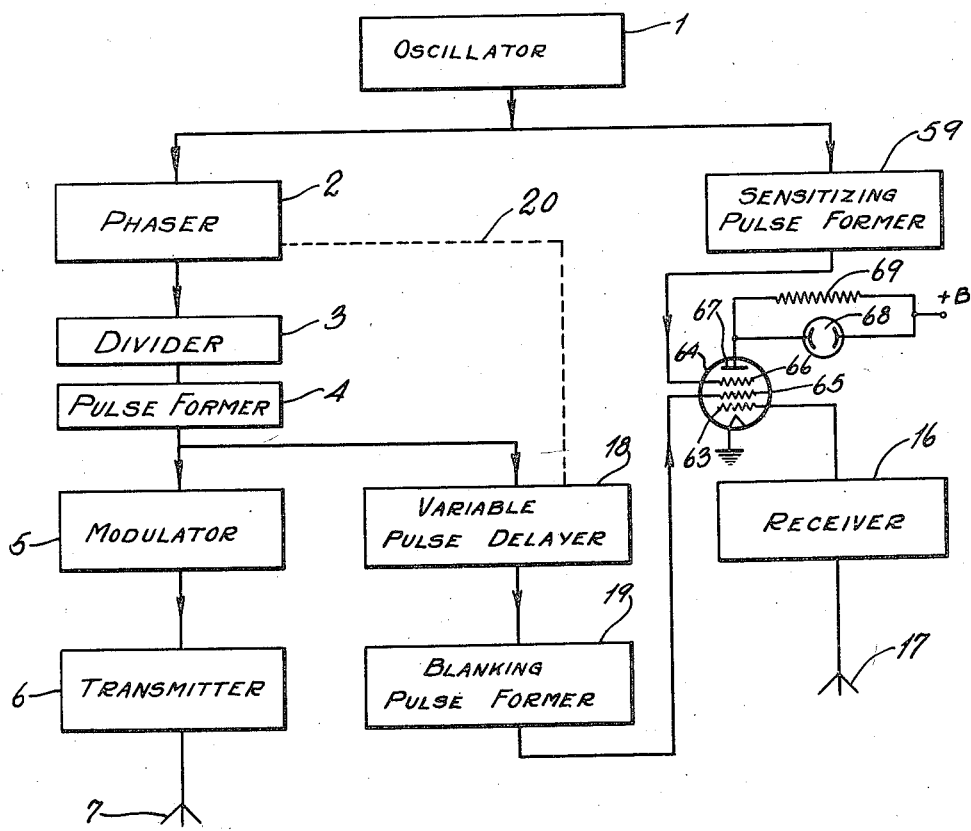
Fig. 9 shows a system similar to Fig. 1 but with a phase comparator of the gas-tube type.
Figure 10:
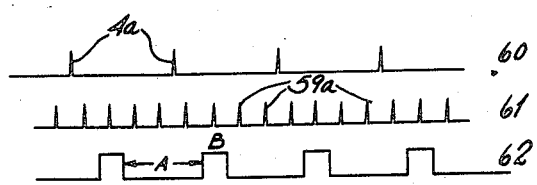
Fig. 10 is a series of wave diagrams explanatory of Fig. 9.

It is not necessary that a cathode-ray tube indicator be used as the null indicating device. A neon lamp or the like can also be used. Thus as shown in Fig. 9 wherein the parts corresponding to those of Fig. 1 bear the same designation numerals, the waves from oscillator 1 are applied to two paths, one leading to the adjustable phaser 2, thence through the divider and pulse former 3, 4, and thence to the modulator 5, transmitter 6 and antenna 7; and in parallel to the variable pulse delayer 18 and blanking pulse former 19. The other path over which the waves from oscillator 1 are transmitted includes a sensitizing pulse former 59 which converts the sinusoidal oscillations from oscillator 1 into sharp pulses 59a (Fig. 10). As described above, the divided pulses 4a from the divider pulse former 3—4 produce blanking pulses A having a predetermined delay with respect to the pulses 4a. The relation between the three sets of pulses 4a, 59a and the blanking pulses are represented by the trace 60, 61 and 62 of Fig. 10. The demodulated output of the receiver 16 is applied to the control grid 63 of a pentode high vacuum tube 64. The blanking pulses from device 19 are applied to the shield grid 65 while the sensitizing pulses 59a are applied to the suppressor grid 66. The plate 67 of the pentode is connected in parallel through a gaseous glow lamp 68 of any well-known type, and resistor 69 to the positive terminal of the power supply. With this arrangement, the pentode 64 is susceptible to conduction to light the lamp 68 only during that instant when the positive or sensitizing component B of the blanking pulse and a corresponding sensitizing pulse 59a are simultaneously applied to the grids 65 and 66. At this instant only a pulse from the receiver 16 will cause the neon tube 68 to flash. Referring to Fig. 10, it will be seen that the blanking pulse of trace 62 appears at the frequency of the divider output but not necessarily at the same phase and the positive component B of the blanking pulse particularizes every fourth sensitizing pulse. Hence, no ambiguity can exist even though the phaser 2 is calibrated to four times 360°.

What I claim is:

1. In a range finder of the echo type, a source of master oscillations, a pair of paths energized under control of said source, a wave radiator and a wave detector in one path, said detector arranged to be controlled by the energy from said radiator as reflected by the object whose range is to be determined, a phase comparator in the other path, a frequency subdivider in one of said paths for producing pulses of longer periodicity than the periodicity of the master oscillations, a phase adjuster in at least one of said paths and acting on the waves from the master oscillator prior to said subdivision, means connecting said paths to said comparator for phase comparison, and means to select for comparison only one particular recurrent cycle of the master oscillation waves in order to avoid phase ambiguity in the comparison between the waves applied to said comparator from said two paths which ambiguity tends to result from the integral frequency relations between the two sets of waves in said paths.

2. In a system of the character described, a master oscillator, a pair of paths excited under control of said oscillator, one of said paths including in sequence a frequency subdivider, a pulse former and a radio transmitter which is controlled by the output of said pulse former; the other of said paths including a steep front signal wave former; a common link between said paths including a radio receiver controlled by said transmitter, and an oscilloscope having two coordinate deflecting systems and a signal indication control element, one of said deflecting systems being controlled by said radio receiver and the other deflecting system being controlled by said steep wave-front signal former in said other path; a calibrated phase adjuster in one of said paths between the master oscillator and the frequency subdivider; means to develop a sensitizing signal at the same periodicity as the signal from said subdivider but delayed in time with respect thereto in accordance with the setting of said phase adjuster, and means to apply said sensitizing signal to said control element.

3. A system according to claim 2 in which said frequency subdivider is of the type which changes conductivity abruptly with the application of a steep wave front thereto and is of the pulse counting type, and means are provided between said subdivider and the sensitizing signal means to limit automatically the effect of spurious pulses in said subdivider to a very small period of time of the order of the periodicity of the subdivided frequency so that the effect of said spurious pulses does not become cumulative.

4. In a system of range finding by radio echo, a cathode-ray tube oscilloscope having three control elements one of which is a control grid and the other two are beam deflection controls, a master oscillator, means to impress on one of said deflection control elements pulses at the master oscillator frequency, a frequency subdivider of the periodic pulse counting type for subdividing the frequency of a portion of the master oscillations, transmitter to transmit said subdivided frequency signals over a high frequency radio channel to an object, means to detect the said signals after reflection from the object, means to apply the detected signals to another deflection control element, means for causing said tube to produce a zero setting indication in response to the direct transmission of signals from said transmitter to said detector, means connected to said control grid to select only a particular recurring period of the master oscillation frequency for comparison with the subdivided frequency means automatically effective to prevent cumulative error in said zero setting when said frequency subdivider miscounts as a result of the spurious injection of pulses into said divider.

5. A pulse delayer comprising a set of three grid-controlled tubes, the first tube being normally biassed to plate current cutoff, while the second and third tubes are normally plate conductive, means responsive to the impression of a sharp pulse on the first tube to render it plate conductive and the second tube non-conductive for a predetermined period of time, means to produce a pair of pulses at the beginning and end of each period of plate conductivity of said second tube, said pairs being of opposite polarity and one of which is in phase synchronism with the pulses impressed on the first tube, and means to impress said pairs of pulses on said third tube whereby the first of each pair is suppressed and the second is inverted in polarity.

6. A pulse delayer comprising a set of three grid-controlled tubes, the first of which is normally biassed to plate current cutoff and the second of which is normally plate conductive, circuit means interconnecting the first and second tubes to render the second tube non-conductive for a predetermined interval after the impression of a sharp pulse on the first tube, means to produce a pair of steep pulses of opposite sign and corresponding respectively to the end and beginning of each plate conductive period of said second tube, and means connecting said second tube to said third tube so that in the output of the third tube the first of each pair of pulses is suppressed and the second is inverted in sign.

7. Apparatus for determining the phase delay in a transmission system comprising means to produce a first periodic signal and a second periodic signal with the periods of the second signal recurring an integral number of times in the interval between successive periods of the first signal, means to produce an indication only during the timed coordination of the periods in one signal with the periods in the other signal, means for producing a known-controlled phase shift in the first signal, and means to maintain said timed coordination for different settings of said phase shift control means to cause said indication to represent the true amount of said phase delay.

8. Apparatus according to claim 7 in which the means for maintaining said timed coordination comprises means to derive a blanking control signal for blanking the said indication producing means during the intervals between successive periods of said first signal.

9. Apparatus according to claim 7 in which the means for maintaining said timed coordination comprises means to derive a blanking control signal for blanking said indication producing means during the intervals between successive periods of the first signal, said blanking signal being phase-locked to said first signal.

10. Apparatus according to claim 7 in which the means for maintaining said timed coordination comprises means to produce a blanking control signal for blanking said indication producing means during the intervals between successive periods of the first signal, means to phase-lock said blanking control signal to said first signal, and means to produce a time delay between said first signal and said blanking control signal which time delay is a function of the setting of said phase shift control means.

11. Apparatus according to claim 7 in which both the first and second signals are of steep front periodic waves.

12. The method of determining the phase delay in a transmission system which comprises, producing a first periodic signal and a second periodic signal with the periods of the second signal recurring an integral number of times in the interval between successive periods of the first signal, producing an indication only during a predetermined time coordination of the periods in the first signal with the periods of the second signal, subjecting the first signal to a phase shift corresponding in amount to the phase delay to be measured while maintaining said timed coordination to cause said indication to represent the true amounts of said phase delay.

13. The method according to claim 12 in which a blanking control signal is produced under control of the first signal for blanking said indication except when the periods of the first and second signals are in said predetermined timed coordination.

14. The method according to claim 12 in which a blanking control signal is produced under control of the first signal for blanking said indication except when the periods of the first and second signals are in said predetermined timed coordination, and controlling the time delay between said blanking control signal and said first signal in accordance with the extent of said phase shift.

15. The method of determining the phase delay in a transmission system which comprises, producing a first periodic signal and a second periodic signal the periodicities of which bear an integral relation greater than unity and with the periods of the second signal recurring an integral number of times in the intervals between successive periods of the first signal, applying both signals to a common phase comparator, shifting the phase of one signal with respect to the other in proportion to the amount of said phase delay to be measured, and producing a blanking control signal for rendering said two signals effective on said comparator only when the periods of the two signals are in a predetermined timed coordination.

16. The method according to claim 15 in which said blanking control signal is time delayed with respect to said first signal, and said time delay is automatically correlated with the extent of said phase shift in the first signal.

17. The method according to claim 15 in which said blanking control signal is produced at the same periodicity as said first signal, but is delayed with respect thereto an amount corresponding to the amount of said phase shift in said first signal.

18. The method of range-finding by a radio echo which comprises, producing a first periodic signal and a second periodic signal with the periods of the second signal recurring an integral number of times in the interval between successive periods of the first signal, converting the first signal into sharp pulses, applying said sharp pulses to modulate a high frequency radio carrier to produce an echo upon reflection from a distant object, producing a blanking control signal under control of said sharp pulses, delaying said blanking control signal with respect to said sharp pulses proportionately to the range to be determined, and simultaneously comparing the echo signal and the second signal under control of said blanking control signal to cause a signal indication to be produced only during the timed coordination between the periods of the first and second signals.

19. In a system of radio-range finding of a distant object, a phase comparator, means to control said comparator simultaneously by waves from a master oscillator transmitted over different paths, one path including a radio channel from the oscillator to and from the object and thence to the comparator, the other path a substantially direct one from the master oscillator to the comparator, a phase adjuster in the first path and adjustable in proportion to the range to be determined, means to subdivide the frequency of the oscillations from the first path to an integral submultiple of the frequency of the waves in the other path, the waves in the second path recurring an integral number of times in the interval between successive waves in the first path, means to detect the radio echo of the waves in said radio channel as reflected from the object, and means to blank out the effect of said recurring waves of those in said other path to cause said comparator to produce a signal indication only when the waves in the first path are in predetermined timed coordination with the waves of the second path and corresponding to the setting of said phase adjuster.

20. In a system of the type described, an indicating phase comparator, means to derive from a common source two periodic signals, the second signal of the said two signals having a plurality of periods recurring between successive periods of the first signal, means to apply said signals to said comparator, means to derive from the first signal a succession of comparator sensitizing signals and at the same periodicity as said first signals, means to adjust the phase of said first signal, and means to apply both said signals and said sensitizing signal to said comparator to cause an indication to be produced only when the periods of the first signal are in timed coordination with predetermined periods of the second signal and corresponding to the setting of said phase adjusting means.

21. A system according to claim 20 in which the said sensitizing signals are provided with means for time delaying them with respect to said first signal to maintain said timed coordination.

22. A system according to claim 20 in which said comparator is a cathode-ray tube oscilloscope having an electron gun for developing an electron beam, a fluorescent screen upon which said beam impinges, a control element for varying the effect of said beam of said screen, and a pair of coordinate beam deflection systems; means to apply the first signal to one of the deflecting systems; means to apply the second signal to the other deflecting system; and means to apply said sensitizing signals to said control element to produce an indication only during said timed coordination.

23. A system according to claim 20 in which said comparator includes an electron-discharge tube having a control grid, a pair of auxiliary grids and a plate, means to apply the first signal to the control grid, means to apply the second signal to one of said auxiliary grids, means to apply said sensitizing signals to another of said auxiliary grids, and an indicator controlled by the plate current of said tube.

24. In a system of the character described, means to produce two signals of different periodicities with the second signal having recurring periods between successive periods of the first signal, means to subject the first signal to a known-controlled phase shift, means to derive a periodic blanking control signal at the same periodicity as said first signal, means to maintain a predetermined timed coordination between the periods of the first and second signals for different adjustments of said phase shift, the last-mentioned means including a pulse former for converting the first signals into sharp pulses, an adjustable pulse delayer upon which a portion of the output of said pulse former is impressed, and means to derive said blanking control signals from said pulse delayer, a phase comparator comprising a grid-controlled electron tube having a plurality of control elements, means to impress said blanking control signals on one of said control elements, and means to impress the first and second signals on other control elements of said tube.

25. In a system of the character described, means to produce two signals of different periodicities with the second signal having recurring periods between successive periods of the first signal, means to subject the first signal to a known-controlled phase shift, means to derive a periodic coordinating signal at the same periodicity as said first signal; means controlled by said coordinating signal to maintain a predetermined timed coordination between the periods of the first and second signals for different adjustments of said phase shift, the last-mentioned means including means to convert the first signals into sharp pulses, means to convert each pulse into a pair of sharp pulses with the second pulse of each pair delayed a predetermined amount, means to suppress the first pulse of each of said pairs, means to convert the unsuppressed pulse of each pair into said coordinating signal, a phase comparator comprising a grid-controlled electron tube having a plurality of elements for controlling the electron stream, means to impress said coordinating signal on one of said control elements, and means to impress the first and second signals on the other control elements of said tube.

26. A system according to claim 25 in which said electron tube is of the cathode-ray oscilloscope type, and said one of said control elements is a control grid, the other control elements being respectively beam-deflecting members, and means to apply said coordinating signal to said control grid so that an indication is produced on the fluorescent screen of the oscilloscope only when said coordinating signal bears a predetermined timed coordination with the periods of said first signal.

27. A system according to claim 25 in which said electron tube is of the pentode type, means to impress said coordinating signal on the shield grid of said pentode, means to impress said first signal on the suppressor grid of said pentode, and means to impress the second signal on the control grid of said pentode.

28. In a system of the character described, a master oscillator for controlling the production of two periodic signals of different periodicity, a frequency divider having a pulse counter for producing the signal of lower periodicity, means to compare the timed coordination of both signals including a phase adjuster, means for producing an indication when said signals are in timed coordination, said pulse counter tending to produce a false count when subjected to spurious impulses, and means to substantially eliminate said false counting.

29. A system according to claim 28 in which said pulse counter is of the type which changes states of conductivity suddenly in response to impressed steep waves, and the last-mentioned means includes a variable pulse delayer controlled by said pulse counter, a blanking pulse former controlling said pulse delayer, and an electron tube having a plurality of electron control elements on which the blanking pulses and the lower periodicity signals are respectively impressed.

30. In combination, means to produce two separate signals in the form of pulses of the same periodicity and of steep wave front, a frequency subdivider of the type employing a pulse counter and which changes states of conductivity suddenly in response to impressed waves, means to impress one of said signals on said subdivider to produce periodic pulses of longer periodicity than the impressed pulses, a visual indicating device for comparing the time coordination of said two signals, said device having means to produce a zero setting indication when both said signals are in timed coordination, said pulse counter tending to produce false zero indications when subjected to spurious impulses, and means to restore automatically said zero setting indication a short interval after said frequency subdivider has been subjected to said spurious impulses.

31. The combination according to claim 30 in which the duration of said interval is limited to a period corresponding to the periodicity of the longer periodicity signal.

32. An arrangement for determining the phase delay in an electric transmission network, comprising a master oscillator, two channels leading from said oscillator and terminating in a phase comparator, one of said channels including in sequence a calibrated variable phase delayer, a frequency subdivider and said transmission network, said phase comparator having a timing control which undergoes a plurality of unit time excursions for each period of the signal from said frequency subdivider, the periodicity of said unit time excursions being "$n$" times the periodicity of said subdivided frequency, where "$n$" is an integer greater than 1, means linking said comparator with said variable phase delayer to cause each successive periods of the subdivided frequency signal to be effective on said comparator only during equal time spaced units of said excursions, and means controlled by said variable delayer to automatically determine the timed coordinations between said subdivided frequency signals and said excursions for comparing the signals in said channels.

33. An arrangement according to claim 32 in which the last-mentioned means controls a coordinating time period of duration substantially equal to the period of the signals from said other channel.

34. The method of producing a series of pulses spaced apart in accordance with a series of like supply pulses but delayed a predetermined time interval in relation thereto, which comprises the steps of generating a pair of pulses of opposite polarity in response to the supply pulses, the first pulses of the pairs being substantially synchronous with the supply pulses and of like polarity, and the second pulses being delayed by the predetermined time interval, blanking the first generated pulses, and inverting the second pulses.

ROBERT M. BOWIE.

REFERENCES CITED

The following references are of record in the file of this patent:

UNITED STATES PATENTS

| Number | Name | Date |
| --- | --- | --- |
| 2,061,734 | Kell | Nov. 24, 1936 |
| 2,121,359 | Luck et al. | June 21, 1938 |
| 2,178,074 | Jakel et al. | Oct. 31, 1939 |
| 2,227,598 | Lyman et al. | Jan. 7, 1941 |
| 2,285,038 | Loughlin | June 2, 1942 |
| 2,344,745 | Somers | Mar. 21, 1944 |
| 2,405,237 | Ruhlig | Aug. 6, 1946 |

FOREIGN PATENTS

| Number | Country | Date |
| --- | --- | --- |
| 113,233 | Australia | June 2, 1941 |
| 468,918 | Great Britain | July 15, 1937 |